2,713,422

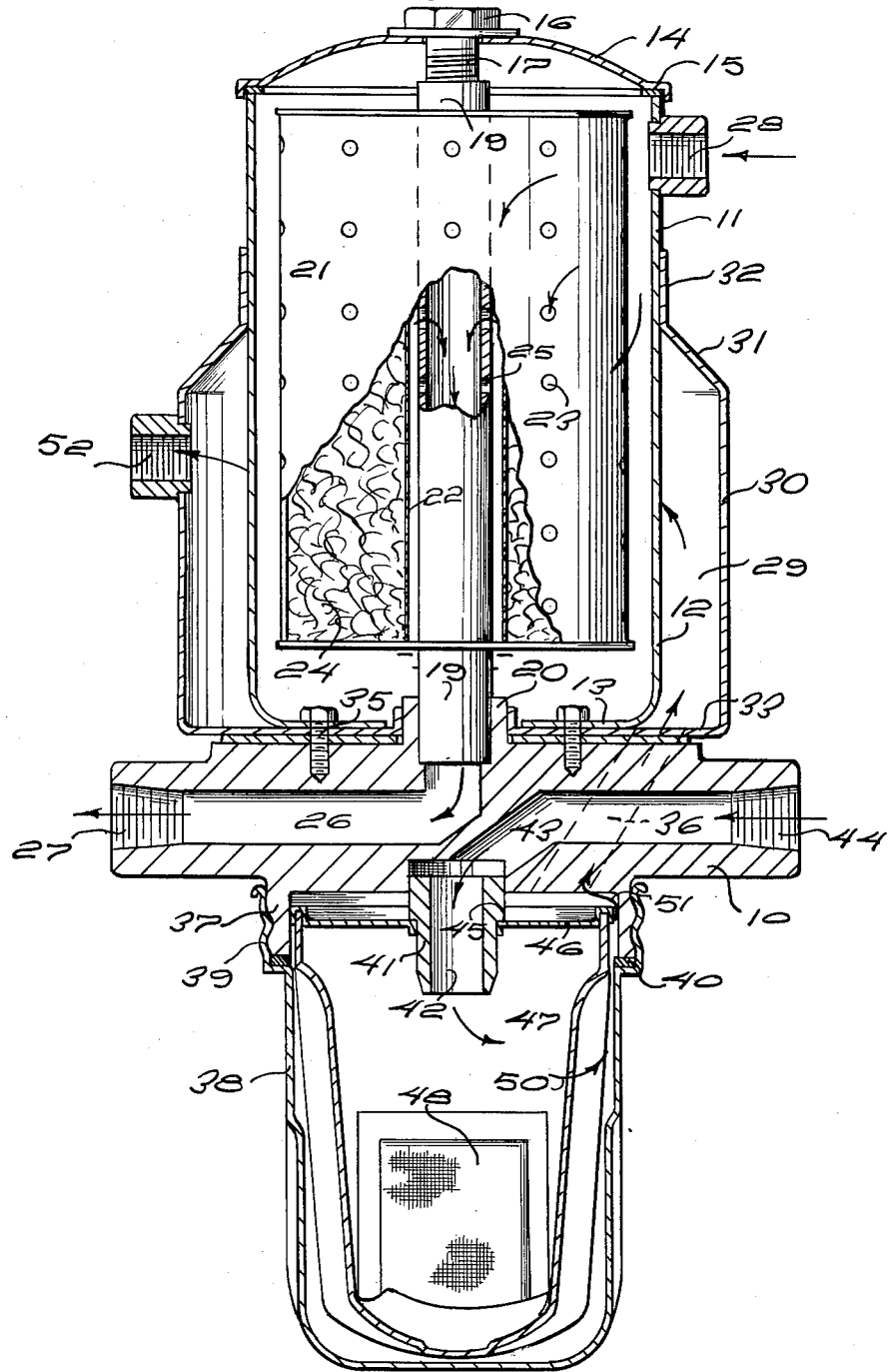
INVENTOR.
WILLIAM S. JAMES

COMBINED OIL AND WATER CONDITIONER

William S. James, Birmingham, Mich., assignor to Fram Corporation, a corporation of Rhode Island Application April 6, 1951, Serial No. 219,583

1 Claim. (Cl. 210—122.5)

This invention relates to a unit for treating the oil and water of an engine such for instance as an internal combustion engine, which uses oil for lubricant and water for cooling.

It is usual in the operation of a motor vehicle to provide a filter for the lubricating oil for the engine and in some cases to provide a filter or some means of treating the cooling water which circulates through the engine. These two units are usually separate so that one has no effect on the other.

One of the objects of this invention is to combine these two usually separate units into a single unit so that the two liquids may have heat exchange relation for providing advantageous conditions in the operation of the oil filter.

Another object of the invention is to utilize the heat of the water for heating the oil which is to be filtered at the location where the oil is to be filtered so as to cause the oil to have a better filtering action.

Another object of the invention is to utilize a single base for the mounting of both units with passages in the base for the convenient conduit of liquid from one filter into a casing about the other filter.

With these and other objects in view, the invention consists of certain novel features of construction, as will be more fully described and particularly pointed out in the appended claim.

In the accompanying drawings the figure is a sectional view illustrating the arrangement of the various parts of the unit which is the subject of this invention.

With reference to the drawing, 10 designates a base which is provided with passages by boring or coring the base to provide the passages desired. On the upper side of the base, I mount a filter casing 11 which has a generally cylindrical wall 12 and a bottom wall 13. At the upper end of this casing, there is a cover 14 which engages a soft gasket 15 on the edge of the wall 12 to seal the upper end of the casing 11. This cover is secured by the head 16 of screw 17 which enters the center tube 19 which extends upwardly from a boss 20 in the base 10.

Within this casing 11, I have located a filter element in the form of a cartridge 21 which receives the center tube 19 centrally thereof and is sealed at its ends to this center tube. This cartridge has a central core 22 which receives the center tube and oil passes through openings 23 in the wall of the cartridge through the filtering material 24 into the annular space between the center core 22 and center tube 19 thence through openings 25 in the center tube and down through the center tube to discharge through a conduit 26 in the base 10 to the outlet port 27. Oil enters the casing 11 through the inlet port 28 and passes into the openings 23.

A water jacket 29 is formed about the casing 11 by means of a cylindrical wall 30 tapered as at 31 and welded to the casing 11 as at 32 while there is a bottom wall 33 which extends beneath the bottom wall 13 of the casing and is secured along with the bottom wall of the casing to the base by screws 35 extending through both bottom walls and into the base. A conduit shown in dotted lines at 36 extends through the base for communication with the water jacket 29.

The lower portion of the base is provided with a boss 37 which has screw threads formed therein and onto these screw threads there is secured a casing 38 by reason of the cup shape threaded end 39 engaging the threads on this boss 37. This casing is sealed against the end of the boss by a shoulder engaging and compressing a soft resilient gasket 40. Centrally of the casing 38 and fixed to the base 10, there is a tubular boss 41 having a bore 42 which communicates with an inlet conduit 43 in the base from a water entrance port 44. This boss 41 is soldered at 45. The boss receives the end wall 46 of a filter cup 47 which is of molded paper the top wall 46 of which fits snugly on the boss 41. A package of water treating material such as some of the acid inhibiting resins is shown at 48 within the filter cup 47. Water entering at port 44 passes into the center of the filter cup through the filter cup as shown by arrow 50 and thence through the conduit 36 as shown by arrow 51 into the water jacket 29 about the filter case 11 and thence from the filter case through the water discharge port 52.

In this way, the circulating water of the system is in heat exchange relation with the oil about the filter, and in cool weather the water which becomes warm and usually has to be cooled by some radiator action will warm the lubricating oil which is to be filtered at the location where the filtering action takes place, thus improving the filtering action. The device comprises a single unit which will require but a single support and will reduce labor in installation.

I claim:

A combined water filter and oil filter for installation in a motor vehicle in the water cooling circuit and engine lubricating circuit respectively, comprising a water filter casing containing a removable filter element connected in the first circuit, an oil filter casing containing a removable filter element connected in the second circuit, so that either filter element can be replaced without disturbing the other filter element, a common base for the two filter casings and through which the water and oil flow, and the oil filter casing having a surrounding water jacket through which the water of the cooling circuit flows to heat the oil filter.

References Cited in the file of this patent

UNITED STATES PATENTS

| | | |
|---|---|---|
| 779,859 | Lukens | Jan. 10, 1905 |
| 1,121,885 | Winton | Dec. 22, 1914 |
| 1,856,771 | Loeffler | May 3, 1932 |
| 2,244,574 | Rogers | June 3, 1941 |
| 2,289,553 | Root | July 14, 1942 |
| 2,353,337 | Henkelman | July 11, 1944 |
| 2,371,444 | Hubert | Mar. 13, 1945 |
| 2,447,144 | Thornton | Aug. 17, 1948 |
| 2,476,405 | Dilworth | July 19, 1949 |
| 2,505,393 | Garner | Apr. 25, 1950 |